United States Patent
Pimentel et al.

[19]

[11] Patent Number: 5,997,047
[45] Date of Patent: Dec. 7, 1999

[54] HIGH-PRESSURE FLEXIBLE SELF-SUPPORTIVE PIPING ASSEMBLY

[76] Inventors: Ralph Pimentel, 1901 SW. Fairlawn, Topeka, Kans. 66604; Gerald Jones, 5423 SE. 2nd St., Tecumseh, Kans.

[21] Appl. No.: 08/888,863

[22] Filed: Jul. 7, 1997

Related U.S. Application Data

[63] Continuation-in-part of application No. 08/608,405, Feb. 28, 1996, Pat. No. 5,667,146.

[51] Int. Cl.$^6$ .................................................... F16L 9/22
[52] U.S. Cl. .................. 285/55; 285/123.17; 285/146.1; 285/184; 285/223; 285/381.4; 248/160; 248/274.1; 239/587.3
[58] Field of Search .................. 285/146.1, 146.2, 285/146.3, FOR 150, 141.1, 136.1, 148.3, 223, 184, FOR 148, FOR 149, 45, 123.17, 381.4, 55; 239/282, 588; 138/120, DIG. 8; 4/596, 605; 248/160, 274.1, 276.1

[56] References Cited

U.S. PATENT DOCUMENTS

| | | | |
|---|---|---|---|
| 428,023 | 5/1890 | Schoff | 138/120 |
| 570,405 | 10/1896 | Jerguson et al. | 285/45 |
| 1,451,800 | 4/1923 | Agner | 138/120 |
| 1,500,921 | 7/1924 | Bramson et al. | |
| 1,695,263 | 12/1928 | Jacques | 285/146.1 X |
| 2,759,765 | 8/1956 | Pawley | 285/144.1 X |
| 2,873,999 | 2/1959 | Webb | |
| 3,910,277 | 10/1975 | Zimmer | 138/120 X |
| 3,929,164 | 12/1975 | Richter | 138/120 |
| 4,243,253 | 1/1981 | Rogers, Jr. | |
| 4,383,554 | 5/1983 | Merriman | |
| 4,946,202 | 8/1990 | Perricone | 285/184 X |
| 4,951,329 | 8/1990 | Shaw | |
| 4,964,573 | 10/1990 | Lipski | |
| 4,972,048 | 11/1990 | Martin | 174/136 |
| 5,022,103 | 6/1991 | Faist | |
| 5,032,015 | 7/1991 | Christianson | 285/223 X |
| 5,046,764 | 9/1991 | Kimura et al. | |
| 5,220,697 | 6/1993 | Birchfield | |
| 5,265,833 | 11/1993 | Heimann et al. | |
| 5,449,206 | 9/1995 | Lockwood | |
| 5,481,765 | 1/1996 | Wang | |
| 5,749,602 | 5/1998 | Delaney | 285/184 X |
| 5,778,939 | 7/1998 | Yin | 138/120 |

FOREIGN PATENT DOCUMENTS

| | | | |
|---|---|---|---|
| 2695452 | 3/1994 | France | 285/184 |
| 8902957 | 6/1991 | Netherlands | 285/223 |

Primary Examiner—Dave W. Arola
Attorney, Agent, or Firm—Litman, Kraai & Brown L.L.C.

[57] ABSTRACT

A high-pressure, flexible, self-supportive piping assembly includes a jointed conduit formed by a plurality of ball and socket joint elements, a flexible internal conduit extending through the jointed conduit, an external sheath, and fittings at opposite ends which communicate with the internal conduit. The sheath is heat shrunk onto the jointed conduit. Each joint element has a ball at one end and a socket at an opposite end whereby the joint elements can be connected serially in end-to-end relationship to form the jointed conduit. The ball of one joint element frictionally engages the socket of the next joint element and, in combination with the stiffness of the external sheath, result in a piping assembly which can selectively configured in shape and which will tend to retain such a shape until subsequently configured.

14 Claims, 1 Drawing Sheet

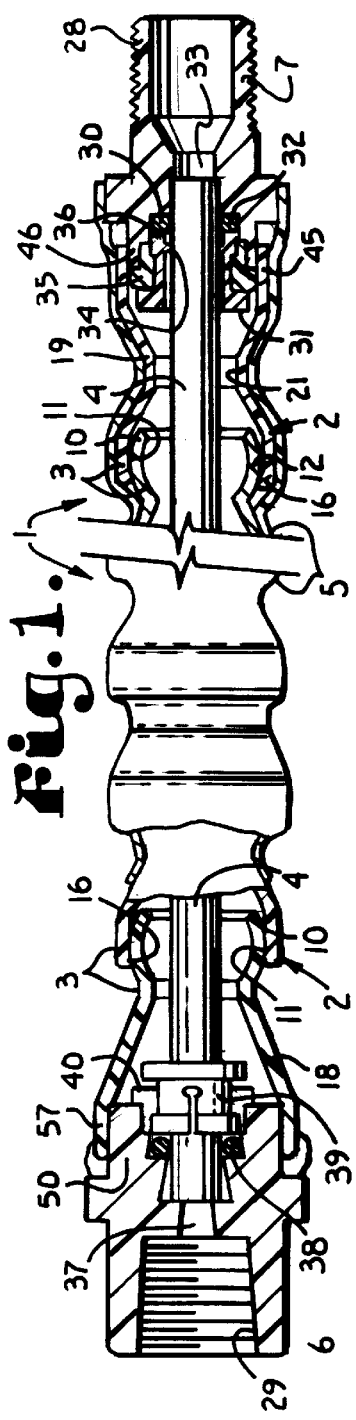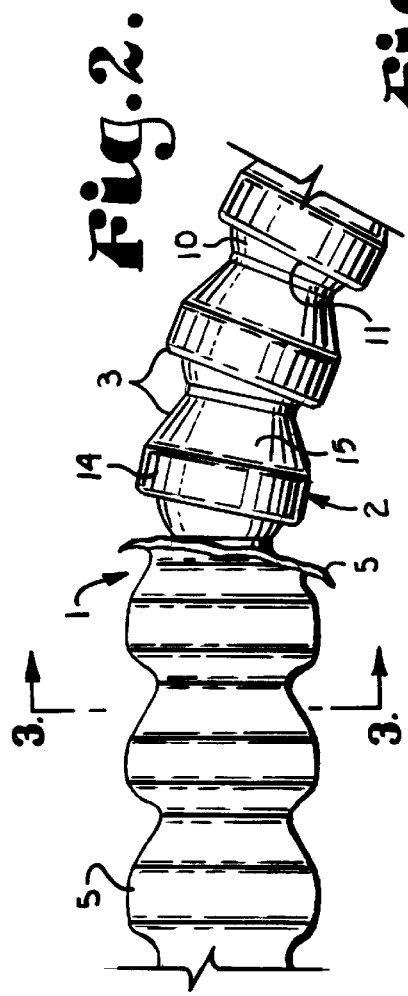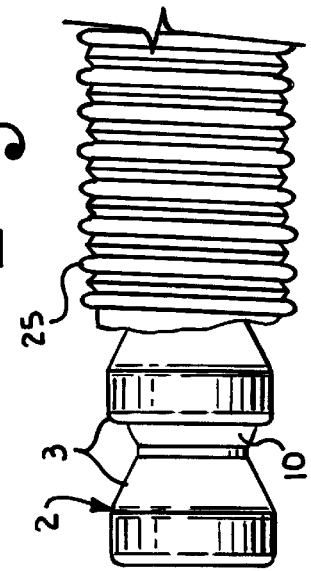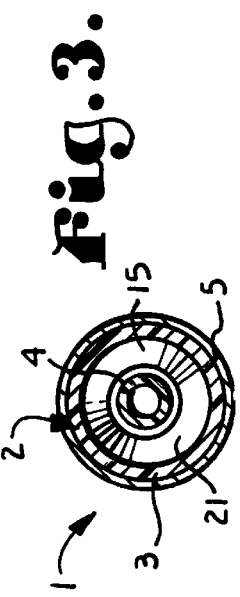

HIGH-PRESSURE FLEXIBLE SELF-SUPPORTIVE PIPING ASSEMBLY

CROSS-REFERENCE TO RELATED APPLICATION

This is a continuation-in-part of U.S. Pat. application Ser. No. 08/608,405, filed Feb. 28, 1996 for HIGH-PRESSURE, FLEXIBLE, SELF-SUPPORTIVE, PIPING ASSEMBLY FOR USE WITH A DIFFUSER/NOZZLE which is now U.S. Pat. No. 5,667,146.

BACKGROUND OF THE INVENTION

The present invention relates to a high pressure, flexible, self-supportive piping assembly allowing convenient placement and directing of a nozzle or diffuser connected to one end of the assembly.

Household showers typically include a shower head mounted from a rigid supply conduit by a ball and socket arrangement to allow the shower to be selectively directed. Other types of shower heads are connected to a flexible conduit which is not self-supporting, although the head is held in the hand to selectively direct the shower spray. As such, conventional shower heads are often difficult to use by persons with limited mobility or with limited use or dexterity of the hands.

SUMMARY OF THE INVENTION

The present invention provides a high-pressure, flexible, self-supportive conduit or piping assembly which can be used with conventional shower heads or other types of spray nozzles. The piping assembly can be configured to a selected shape and tends to retain the shape until reconfigured because of the cooperation of components from which the assembly is made. As a shower head support, the piping assembly can be flexed to position and orient the shower head in any desired location and direction and will remain in such position and orientation until deliberately changed by a user or even the next user of the shower.

In general, the piping assembly is formed by a jointed conduit, a flexible internal fluid carrying conduit extending through the jointed conduit, and preferably an outer sheath which is shrink fitted onto the jointed conduit. Each joint element of the jointed conduit is tubular and includes a ball at one end and a socket at the opposite end. Each joint element has two degrees of angular freedom relative to an adjacent joint element for universal pivoting relative to the adjacent joint element. Frictional engagement between the ball of one joint element and the socket of an adjacent joint element frictionally resists pivotal movement of one joint element relative to the next, but the friction can be overcome to allow selective pivoting of one element relative to the next.

A water source fitting is attached to the joint element at an inlet end of the jointed conduit and fluidically communicates with the internal conduit. The source fitting allows fluid connection of the assembly to a water source conduit. At an outlet end of the assembly, a shower head fitting and a shower head connect with the jointed conduit and fluidically connect with the inner conduit.

The shrink fitted sheath engages the outer surfaces of the jointed conduit and contributes additional resistance to relative pivoting of one joint element to the next, but does not prevent such pivoting. Additionally, the sheath adds to the aesthetic appearance of the assembly and prevents the entry of water scale, soap scum, and other contaminants into the jointed conduit elements which might otherwise interfere with desired relative movement of one joint element with the next. Alternatively, other types of outer coverings for the piping assembly can be used, such as a spirally corrugated type of sheath which does not affect flexure of the jointed conduit or simply a smooth surfaced outer tube which is flexible.

The piping assembly of the present invention can be retrofit to an existing shower assembly or nay be installed in newly constructed shower stalls, bathtubs, or other bathing facilities, such as shower rooms at schools, gymnasiums, or the like. Depending on the length of the piping assembly, a shower head using the piping assembly can be positioned in a range from a high location for a tall adult to a relatively low position for a child. The piping assembly can also be conveniently used by a person with limited mobility or with limited manual dexterity and, once positioned, stays in place without the use of one hand to hold the shower head in place. Thus, the piping assembly can provide convenient showering facilities for persons in a seated position or someone requiring a walker.

The piping assembly of the present invention has additional applications in spraying liquids or particulates in mobile and fixed situations, such as in industrial, agricultural, and lawn and garden use.

OBJECTS AND ADVANTAGES OF THE INVENTION

The principal objects of the present invention are: to provide an improved piping or conduit assembly; to provide such an assembly which can be selectively configured in shape by flexing to overcome frictional engagement among components of the assembly and which tends to retain the shape until subsequently configured; to provide such an assembly including a jointed tubular conduit, a flexible fluid carrying conduit extending through the jointed conduit, and fittings on the opposite end which fluidically communicate with the fluid carrying conduit and are structurally connected to the jointed conduit to allow fluid connection of the conduit to a source of fluid and the connection of a fluid dispersing device, such as a shower head, at the opposite end; to provide such an assembly which preferably includes an outer sheath which is shrink fit to the jointed conduit and which increases the static rigidity of the assembly which can be overcome to selectively shape the piping assembly; to provide such an assembly which can alternatively be provided with an outer sheath which does not contribute to the rigidity of the assembly but is mainly decorative; to provide such an assembly which enables selective positioning and orientation of a fluid dispersing device, such as a shower head; to provide such an assembly which allows convenient and relatively wear-free adjustment of the fluid dispersing device; to provide such an assembly which does not show significant stress or reduction in performance after a large number of adjustments; to provide such a piping assembly which can be conveniently retrofitted to existing bathing facilities; to provide such an assembly which can provide more convenient showering facilities for persons having limited mobility or manual dexterity; and to provide such a self supporting flexible piping assembly which is economical to manufacture, which is convenient in use and capable of a long operating life, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary sectional view of a self-supporting flexible piping assembly which embodies the present invention, shown with a water source fitting at one end and a shower head fitting at the opposite end.

FIG. 2 is a fragmentary side elevational view of the piping assembly with a section of a shrink fit outer sheath removed and illustrate details of joint elements of a jointed conduit of the assembly.

FIG. 3 is a transverse sectional view taken on line 3—3 of FIG. 2 and illustrates a coaxial relationship between an inner conduit, the jointed conduit, and the outer sheath.

FIG. 4 is a fragmentary side elevational view of a modified embodiment of the piping assembly of the present invention and illustrates an alternative outer sheath for the assembly.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a high pressure, flexible, self-supportive piping or conduit assembly which embodies the present invention. The piping assembly 1 generally includes a jointed or segmented conduit 2 formed by a plurality of serially connected ball and socket joint elements 3, a flexible internal conduit 4 extending through the jointed conduit 2, and preferably an external sheath 5 which covers the jointed conduit 2. End fittings 6 and 7 are positioned at opposite ends of the jointed conduit 2 and provide for connection to a source (not shown) of fluid and a fluid dispersion device (not shown).

The jointed conduit 2, internal conduit 4, and the sheath 5 cooperate to allow the assembly 1 to be selectively shaped and to retain the shape until the assembly 1 is subsequently reconfigured. The illustrated piping assembly 1, with the fittings 6 and 7, is suitable for supporting a shower head (not shown) in a shower stall or bathtub to allow the shower head to be positioned at a selected convenient height and lateral position and with the shower head oriented in a desired direction.

Referring to FIGS. 1 and 2, each of the illustrated joint elements 3 includes a ball member 10 at one end and a socket 11 at an opposite end. The ball 10 is formed by a frusto-spherically shaped wall 12. The socket 11 is formed by a cylindrical end wall 14 and a frusto-conical intermediate wall 15 which connects between the spherical wall 12 and the cylindrical wall 14 of an individual joint element 3. The cylindrical wall 14 has an inwardly directed circumferential rim 16. Adjacent joint elements 3 are serially connected by snapping the ball 10 of one joint element 3 past the rim 16 into a socket 11 of the next joint element to form the jointed conduit 2. Each joint element 3 preferably has two degrees of pivotal freedom relative to an adjacent joint element. That is, each joint element 3 is pivotable about two orthogonal axes of a three dimensional frame of reference. This relationship allows universal pivoting of adjacent joint elements 3. Alternatively, the jointed conduit 2 may be formed by joint elements having pivoting capability about a single axis relative to an adjacent joint element.

Each ball 10 fits relatively tightly into the socket of the next joint element 3 such that there is friction between the spherical wall 12 forming the ball 10 of one joint element 3 and the cylindrical wall 14, conical wall 15, and rim 16 forming the socket 11 of the next joint element. As shown in FIG. 1, special end elements 18 and 19 may be used for convenient engagement with the fittings 6 and 7. The joint elements 3 are preferably formed of a somewhat pliable plastic, such as polyvinyl chloride (PVC). Further details of a suitable type of jointed conduit 2 for use in the assembly 1 can be found in U.S. Pat. No. 5,449,206 which is incorporated herein by reference. A commercially available product which is suitable for use as the jointed conduit 2 is sold in a range of diameters under the trademark Loc-Line by Lockwood Products, Inc. of Lake Oswego, Oreg.

The flexible conduit 4 extends through an opening 21 (FIG. 3) formed through each joint element 3. The conduit 4 is formed of a flexible plastic which is capable of withstanding high temperatures and high fluid pressures, on the order of 180° F. and 300 psi, for shower applications. Alternatively, the conduit 4 may be formed to other specifications appropriate to the application for which the assembly 1 is intended.

The illustrated external sheath 5 is preferably a heat shrinkable material such as irradiated polyvinyl chloride flexible tubing. The sheath 5 contacts the outer surfaces of the jointed elements 3 and, upon being shrunk, further resists flexure of the jointed conduit 2 to give the assembly 1 even greater static rigidity. The degree of rigidity added can be controlled by appropriate selection of the wall thickness of the sheath 5 or by employing multiple layers of the sheath 5. The resistance to flexure of the assembly 1 can be overcome by average manual strength but causes the assembly 1 to tend to retain its shape once configured. The sheath 5 has the additional function of isolating the joint elements 3 from contaminants such as soap scum, water scale, dust, or the like which might otherwise prevent or interfere with desired flexure of the assembly 1 and skin oils, shampoo conditioners, or the like which might reduce the capability of the assembly 1 to retain a desired shape. Alternatively, other types of sheaths could be employed in the assembly 1, such as the spirally corrugated sheath 25 (FIG. 4). The sheath 25 is principally used for aesthetic covering of the jointed conduit 2, but also isolates the conduit 2 from the contaminants described above. The sheath 25 does not significantly affect the static rigidity of the assembly 1. The assembly 1 can also be provided with an internal conduit but without an external sheath 5 in some applications.

The assembly 1, as illustrated in FIG. 1 is suitable for supporting a shower head (not shown). The fitting 7 has an externally threaded neck 28 to receive such a shower head. The opposite fitting 6 has an internally threaded neck 29 for fitting onto a threaded shower supply pipe (not shown). the fitting 7 is fluidically connected to the internal conduit 4 and is sealed by cooperation of a pliable O-ring 30 and a collet 31. The O-ring 30 is slipped over an end of She conduit or hose 4 so that it engages an external surface of the conduit 4. The O-ring 30 also engages a sealing shoulder 32 within the fitting 7 thereby providing fluid sealing between the shoulder 32 and the outer surface of the conduit 4.

The conduit 4 extends into the fitting 7 to communicate with an exit port 33 therein. The collet 31 is received over the end of the conduit 4 prior to installation of the O-ring 30 and has an internal rim 34 which engages the outer surface of the conduit 4 whereby the collet 31 clampingly grips the conduit 4 when external pressure is applied thereto. A mounting ring 35 is received over the collet 31 and applies such external pressure thereto when the mounting ring 35 is pressed into a counterbore within the fitting 7 where it may be retained by welding, cementing, or the like. An end 36 of the collet 31 presses the O-ring 30 into engagement with the sealing shoulder 32.

In a similar manner, the conduit 4 sealingly and fluidically communicates with an entrance port 37 of the fitting 6 by employment of an O-ring 38, a collet 39, and a mounting ring 40. The fittings 6 and 7 and the sealing and mounting arrangements of the conduit 4 described above cooperate to form a very effective fluid seal which is difficult to break, even with great tension or internal pressure within the conduit 4.

The illustrated end joint element 19 is provided with a socket 11 at one end to receive a ball 10 of an adjacent joint element 3. At an opposite end of the element 19, a cylindrical wall 45 is provided for receiving a mounting extension 46 of the fitting 7. The wall 45 may be secured to the extension 46 by welding, cementing, or the like. The illustrated end joint element 18 is specially adapted to engage a mounting extension 50 of the fitting 6 and has an enlarged socket wall 51 at one end and a ball 10 at the opposite end for reception in a socket 11 of the next joint element 3. The socket wall 51 is secured to the mounting extension 50 by welding, cementing, or the like. Preferably, the sheath 5 extends past the regions of attachment of the elements 18 and 19 to their respective fittings 6 and 7 for aesthetic purposes.

While the wiping assembly 1 has been described primarily in terms of a support for a shower head for bathing purposes, its use is not intended to be so limited. Other uses of the assembly 1 in fluid spraying applications is also contemplated. Additionally, the use of the assembly 1 as a configurable support arm is also contemplated, in which the assembly 1 is used to support an article at one end with or without an internal conduit, cable, or the like. The combination of the jointed conduit 3 and external sheath 5 provide a support arm which can be shaped as desired and which will tend to retain the shape until reconfigured.

Thus, it is to be understood that while certain forms of the present invention have been illustrated and described herein, it is not to be limited to the specific forms or arrangement of parts described and shown.

What is claimed and desired to be secured by Letters Patent is as follows:

1. A self-supporting conduit assembly comprising:
   (a) an elongated jointed support having opposite ends and including a plurality of serially connected joint elements, each joint element being pivotable relative to an adjacent element through a limited angle of pivot, and each joint element frictionally engaging an adjacent joint element such that pivoting a joint element relative to an adjacent joint element is resisted by friction;
   (b) an elongated flexible conduit having opposite ends and extending along said jointed support and engaging said jointed support at spaced intervals therealong;
   (c) a first fluid fitting fluidically connected to a first end of said flexible conduit and being connected to a first end of said jointed support;
   (d) a second fluid fitting fluidically connected to a second end of said flexible conduit and being connected to a second end of said jointed support; and
   (e) a sheath shrink-fitted directly onto and conforming to the shape of the outside surface of said jointed conduit.

2. An assembly as set forth in claim 1 wherein:
   (a) said jointed support is a jointed conduit and each of said jointed elements is tubular; and
   (b) said flexible conduit extends substantially coaxially through said jointed conduit.

3. An assembly as set forth in claim 1 wherein:
   (a) each joint element is pivotable about two axes of freedom with respect to an adjacent joint element.

4. An assembly as set forth in claim 1 and including:
   (a) each joint element including a ball component at one end thereof;
   (b) each joint element including a socket component at an opposite end from said ball component;
   (c) a ball component of one joint element being received and retained in a socket component of an adjacent joint element;
   (d) each joint element having at least two axes of pivotal freedom of movement relative to an adjacent joint element; and
   (e) frictional engagement between a ball component of one joint element and a socket component of an adjacent joint element causing resistance of said pivotal freedom of movement between one joint element and an adjacent joint element.

5. An assembly as set forth in claim 1 wherein:
   (a) said joint support and said flexible conduit cooperate to form a fluid carrying conduit assembly which is selectively configurable in shape and which retains said shape until subsequently reconfigured.

6. A self-supporting conduit assembly comprising:
   (a) an elongated jointed conduit having opposite ends and including a plurality of serially connected, tubular joint elements, each joint element being pivotable relative to an adjacent joint element through a limited angle of pivot, and each joint element frictionally engaging an adjacent joint element such that pivoting a joint element relative to an adjacent joint element is resisted by friction;
   (b) an elongated flexible conduit having opposite ends and extending in substantially coaxial relation through said jointed conduit;
   (c) a first fluid fitting fluidically connected to a first end of said flexible conduit and being connected to a first end of said jointed conduit;
   (d) a second fluid fitting fluidically connected to a second end of said flexible conduit and being connected to a second end of said jointed conduit; and
   (e) an elongated flexible outer sheath extending between respective sets of said opposite ends of said jointed conduit and said flexible conduit and enclosing said jointed conduit and said flexible conduit therein, said sheath being shrunk-fit directly onto and conforming to the shape of the outside surface of said jointed conduit.

7. An assembly as set forth in claim 6 wherein:
   (a) each joint element is pivotable about two axes of freedom with respect to an adjacent joint element.

8. An assembly as set forth in claim 6 and including:
(a) each joint element including a ball component at one end thereof;
(b) each joint element including a socket component at an opposite end from said ball component;
(c) a ball component of one joint element being received and retained in a socket component of an adjacent joint element;
(d) each joint element having at least two axes of pivotal freedom of movement relative to an adjacent joint element; and
(e) frictional engagement between a ball component of one joint element and a socket component of an adjacent joint element causing resistance of said pivotal freedom of movement between one joint element and an adjacent joint element.

9. An assembly as set forth in claim 6 wherein:
(a) said joint conduit and said flexible conduit cooperate to form a fluid carrying conduit assembly which is selectively configurable in shape and which retains said shape until subsequently reconfigured.

10. A self-supporting conduit assembly comprising:
(a) an elongated jointed conduit having opposite ends and including a plurality of serially connected, tubular joint elements, each joint element being pivotable relative to an adjacent joint element through a limited angle of pivot about two axes of pivotal freedom of movement relative to said adjacent joint element, and each joint element frictionally engaging an adjacent joint element such that pivoting a joint element relative to an adjacent joint element is resisted by friction;
(b) an elongated flexible conduit having opposite ends and extending in substantially coaxial relation through said jointed conduit;
(c) a first fluid fitting fluidically connected to a first end of said flexible conduit and being connected to a first end of said jointed conduit;
(d) a second fluid fitting fluidically connected to a second end of said flexible conduit and being connected to a second end of said jointed conduit;
(e) an elongated flexible outer sheath extending between respective sets of said opposite ends of said jointed conduit and said flexible conduit and enclosing said jointed conduit and said flexible conduit therein, said sheath being shrunk-fit directly onto and conforming to the shape of the outside surface of said jointed conduit; and
(f) said joint conduit and said flexible conduit cooperate to form a fluid carrying conduit assembly which is selectively configurable in shape and which retains said shape until subsequently reconfigured.

11. An assembly as set forth in claim 10 and including:
(a) each joint element including a ball component at one end thereof;
(b) each joint element including a socket component at an opposite end from said ball component;
(c) a ball component of one joint element being received and retained in a socket component of an adjacent joint element;
(d) each joint element having at least two axes of pivotal freedom of movement relative to an adjacent joint element; and
(e) frictional engagement between a ball component of one joint element and a socket component of an adjacent joint element causing resistance of said pivotal freedom of movement between one joint element and an adjacent joint element.

12. A configurable support assembly for supporting an article in a selected position and orientation relative to a structure and comprising:
(a) an elongated jointed support having opposite ends and including a plurality of serially connected joint elements, each joint element being pivotable relative to an adjacent element through a limited angle of pivot, and each joint element frictionally engaging an adjacent joint element such that pivoting a joint element relative to an adjacent joint element is resisted by friction;
(b) a first fitting connected to a first end of said jointed support and enabling connection of said first end of said jointed support to a structure;
(c) a second fitting connected to a second end of said jointed support and enabling connection of an article to said jointed support; and
(d) an elongated external sheath received on said jointed support and engaging said joint elements in such a manner as to further resist pivoting of a joint element relative to an adjacent joint element, said sheath being shrunk-fit directly onto and conforming to the shape of the outside surface of said jointed support.

13. An assembly as set forth in claim 12 wherein:
(a) each joint element is pivotable about two axes of freedom with respect to an adjacent joint element.

14. An assembly as set forth in claim 12 wherein:
(a) each joint element is pivotable about two axes of freedom with respect to an adjacent joint element.

* * * * *